(12) United States Patent
Karlsson

(10) Patent No.: US 10,822,027 B2
(45) Date of Patent: Nov. 3, 2020

(54) FRONT WHEELHUB ASSEMBLY DISCONNECTION ARRANGEMENT FOR A ROAD VEHICLE

(71) Applicant: Volvo Car Corporation, Gothenburg (SE)

(72) Inventor: Daniel Karlsson, Ytterby (SE)

(73) Assignee: Volvo Car Corporation, Gothenburg (SE)

( * ) Notice: Subject to any disclaimer, the term of this patent is extended or adjusted under 35 U.S.C. 154(b) by 86 days.

(21) Appl. No.: 16/393,218

(22) Filed: Apr. 24, 2019

(65) Prior Publication Data

US 2019/0359256 A1 Nov. 28, 2019

(30) Foreign Application Priority Data

May 22, 2018 (EP) .................................... 18173467

(51) Int. Cl.
*B62D 7/18* (2006.01)
*B60G 3/06* (2006.01)
*B60G 7/00* (2006.01)
*B60G 7/02* (2006.01)

(52) U.S. Cl.
CPC .................. *B62D 7/18* (2013.01); *B60G 3/06* (2013.01); *B60G 7/001* (2013.01); *B60G 7/02* (2013.01)

(58) Field of Classification Search
None
See application file for complete search history.

(56) References Cited

U.S. PATENT DOCUMENTS

| 8,985,258 | B1 * | 3/2015 | Midoun | B62D 25/082 |
| | | | | 180/274 |
| 10,059,288 | B2 * | 8/2018 | Canobbio | B62D 21/152 |
| 10,759,244 | B2 * | 9/2020 | White | B60G 7/02 |

(Continued)

FOREIGN PATENT DOCUMENTS

| DE | 102004021165 A1 | 11/2005 |
| JP | 2014034382 A | 2/2014 |
| JP | 2016159676 A | 9/2016 |

OTHER PUBLICATIONS

Nov. 6, 2018 European Search Report issue on International Application No. EP18173467.

*Primary Examiner* — Drew J Brown
(74) *Attorney, Agent, or Firm* — Clements Bernard Walker; Christopher L. Bernard

(57) ABSTRACT

A front wheel hub assembly disconnection arrangement configured to promote disconnection and outwards movement of a front wheel hub assembly from a vehicle body structure during a small partial overlap collision, including: a steering knuckle breaker and the front wheel hub assembly including a wheel hub and a steering knuckle for connection to a tie rod of a steering mechanism, the steering knuckle arranged on a rearward facing portion of the wheel hub, wherein the steering knuckle breaker is arranged on an A-pillar of the vehicle body structure and includes an impact surface facing the steering knuckle when the wheel hub is in a neutral position, such that in the event of a small overlap collision, the steering knuckle is displaced towards and collides with the steering knuckle breaker, such that the steering knuckle breaker breaks the steering knuckle and disconnects the steering knuckle from the wheel hub.

12 Claims, 8 Drawing Sheets

(56) References Cited

U.S. PATENT DOCUMENTS

| | | | |
|---|---|---|---|
| 2003/0090099 A1* | 5/2003 | Miyasaka | B62D 21/15 |
| | | | 280/784 |
| 2003/0141712 A1* | 7/2003 | Miyasaka | B62D 21/15 |
| | | | 280/784 |
| 2014/0091595 A1 | 4/2014 | Ramoutar et al. | |
| 2014/0252742 A1* | 9/2014 | Lam | B60G 7/003 |
| | | | 280/124.134 |
| 2015/0246692 A1 | 9/2015 | Shivaprasad et al. | |
| 2018/0093544 A1* | 4/2018 | Westnedge | B62D 7/144 |
| 2019/0023323 A1* | 1/2019 | Uehata | B62D 21/15 |
| 2019/0225271 A1* | 7/2019 | Klinger | B62D 21/15 |

* cited by examiner

FRONT WHEELHUB ASSEMBLY DISCONNECTION ARRANGEMENT FOR A ROAD VEHICLE

CROSS-REFERENCE TO RELATED APPLICATION

The present disclosure claims the benefit of priority of co-pending European Patent Application No. 18173467.4, filed on May 22, 2018, and entitled "FRONT WHEELHUB ASSEMBLY DISCONNECTION ARRANGEMENT FOR A ROAD VEHICLE," the contents of which are incorporated in full by reference herein for all purposes.

TECHNICAL FIELD

Embodiments herein relate to a front wheel hub assembly disconnection arrangement for a road vehicle configured to promote disconnection and outwards movement of a front wheel hub assembly from a vehicle body structure during a small partial overlap collision. Embodiments herein further relate to a vehicle including a front wheel hub assembly disconnection arrangement, the use of a steering knuckle breaker for effecting detachment of a tie rod from a front wheel hub assembly during a collision, and the use of a front wheel hub assembly disconnection arrangement in a vehicle, for effecting detachment of a tie rod from the front wheel hub assembly during a collision.

BACKGROUND

A Small Partial Overlap Collision (SPOC) is often considered as being one of the toughest crash scenarios. Typically, during the SPOC, a road vehicle collides with an obstacle while travelling straight ahead having a neutral steering, i.e. with a wheel hub being in a neutral position and a wheel arranged on the wheel hub pointing substantially in a straight forward direction. The road vehicle collides with the obstacle in such a way that only an outmost part of a front width of the road vehicle collides with the obstacle, such as e.g. another vehicle, a tree, a pole or any other barrier. The energy from the impact is usually absorbed laterally outside a main front frame of the road vehicle by only around 25-30 percent of the front area, thus main structural members of the vehicle have a tendency to be bypassed which leads to weaker parts of the vehicle absorbing the energy, such as e.g. a bumper, chassis components, a wheel and an A-pillar of the vehicle body structure on the side of the impact. Typically, the front wheel hub assembly and the wheel are forced backwards towards the corresponding A-pillar. The wheel, which typically is stiffer than the rest of the passenger compartment, may during the SPOC get caught between the obstacle hit by the vehicle and the A-pillar of the vehicle and may thus damage and/or deform the A-pillar which may cause damaged parts to intrude into the passenger compartment of the vehicle. Since the damaged parts intrude into the passenger compartment, the risk of serious injury for the vehicle passengers drastically increases.

Typically, in order to overcome these problems, the stiffness of the vehicle body structure, in particular the A-pillar, is increased in order to be able to absorb the energy from the impact. A two-legged side member design may be used which has the benefits of supporting the A-pillar and guiding the wheel away from the A-pillar. The two-legged side member includes two sections, which are able to transfer load to the A-pillar. The two-legged side member has the benefit that by providing a second lower leg, the stiffness of the side member is increased and the lower side-member can be used to guide away the wheel hub assembly. However, the two-legged side member comes with the penalty of extra weight and cost. Due to this weight increase of the vehicle structure, the performance of the road vehicle may be reduced and the fuel consumption increased.

US20150246692 A1 discloses a front pillar construction including a reinforcement member fixedly secured to the pillar member and arranged to break a wheel of the vehicle during small overlap frontal crashes. However, such a solution requires a two-piece wheel in order to allow the wheel to be split in two pieces in accordance to the disclosure. Typically, current wheels are forged from an aluminium/magnesium alloy in one single piece, which is then machined into shape. Such wheels are very strong and are thus hard to break unless they are designed to break in a controlled manner. These wheels can also not be buckled in order to absorb the energy of the crash, hence the front pillar has to absorb very high energies during the impact. Furthermore, vehicle owners often change the wheels in order to customize the design of their vehicle. Replacing the wheel with a wheel which is not intended to break, would thus negatively influence the safety of the passenger in the vehicle. This solution thus has the drawback that the safety of the vehicle varies depending on the wheel mounted to the vehicle. There is thus no possibility for a vehicle manufacturer to guarantee that the safety features will work properly in case of an accident.

SUMMARY

Embodiments herein therefore aim to provide an arrangement which improves the safety of the vehicle passengers during the SPOC while reducing the weight of the vehicle, and which arrangement cannot be easily bypassed.

This is achieved by means of a front wheel hub assembly disconnection arrangement for a road vehicle. The front wheel hub assembly disconnection arrangement is configured to promote disconnection and outwards movement of a front wheel hub assembly from a vehicle body structure during a small overlap collision. The front wheel hub assembly disconnection arrangement includes a steering knuckle breaker and the front wheel hub assembly, the front wheel hub assembly including a wheel hub and a steering knuckle for connection to a tie rod of a steering mechanism. The steering knuckle is arranged on a rearward facing portion of the wheel hub, seen in a direction of travel of the road vehicle. The steering knuckle breaker is arranged on an A-pillar of the vehicle body structure and includes an impact surface facing the steering knuckle when the wheel hub is in a neutral position, such that in the event of a small overlap collision, the steering knuckle of the front wheel hub assembly is displaced towards and collides with the steering knuckle breaker, such that the steering knuckle breaker breaks the steering knuckle and disconnects the steering knuckle from the wheel hub of the front wheel hub assembly. Thereby the tie rod connected to the steering knuckle is released from the front wheel hub assembly.

By releasing the tie rod connected to the steering knuckle from the front wheel hub assembly, the degree of freedom for the front wheel hub assembly may be increased since the movement of the front wheel hub assembly will no longer be limited by the tie rod and the steering rack connected thereto. Thereby the wheel may rotate so that the wheel will not impact the A-pillar in a radial direction of the wheel but rather may be turned outwards so that the impact may occur substantially in an axial direction of the wheel. This will not only increase the distance the wheel can travel before hitting the A-pillar but will also cause the wheel to hit the A-pillar with a weaker side, thereby reducing the force acting on the A-pillar during the collision. This further has the benefit that the weight of the A-pillar may be reduced while improving the safety of the passengers of the vehicle, which allows for a weight reduction of the vehicle body. Furthermore, since the steering knuckle is an integrated component of the vehicle, which is typically not replaced by an owner or a user of the vehicle, a reproducible behavior of the front wheel hub assembly disconnection arrangement can be provided.

Optionally, the steering knuckle may include a weakened zone adapted to form a predetermined breaking line. This provision has the benefit that the steering knuckle can be designed to break in a controlled manner.

Optionally, the impact surface may be arranged at an angle of attack to a plane perpendicular to a longitudinal axis of the road vehicle, when the steering knuckle breaker is mounted on the A-pillar. Thus, when the steering knuckle fails, the front wheel hub assembly is moved away from a longitudinal central axis of the vehicle body structure. This provision has the benefit that the impact surface may be directed towards the steering knuckle, such that the direction of impact between the impact surface and the steering knuckle is adapted to break the steering knuckle. By arranging the impact surface at an angle to the direction of impact of the steering knuckle, a bending moment may be introduced to the steering knuckle, which facilitates the breaking of the steering knuckle. A further benefit is that the angle of the impact surface may direct the front wheel hub assembly in a predetermined direction during the impact, such that the wheel is forced to turn. Thereby, the wheel can be rotated away from impacting the A-pillar in a radial direction.

Optionally, the angle of attack of the steering knuckle breaker may be in the range of 2-25 degrees, preferably in the range of 5-20 degrees, relative to the plane perpendicular to the longitudinal axis of the road vehicle, when the steering knuckle breaker is mounted on the A-pillar. Thereby, the direction of impact between the steering knuckle and the impact surface of the steering knuckle breaker may be further calibrated to provide a controlled and effective disconnection of the tie rod from the wheel hub and movement of the front wheel hub assembly away from the A-pillar.

Optionally, the steering knuckle breaker may be attached to the A-pillar of the vehicle body structure by means of fastening means, such as a screw, a nut, a riveting element and/or by welding. This provision has the benefit that the steering knuckle breaker is securely attached to the vehicle body and ensures that the steering knuckle breaker is properly located to disconnect the tie rod during a SPOC.

Optionally, the wheel hub may be connected to a link arm, which link arm is connectable to the vehicle body structure through a first and a second arm element. The first arm element may be arranged to be connected to a first connection element in the vehicle body structure. The second arm element may be arranged to be rotatably connected to a second connection element in the vehicle body structure around a first rotation axis substantially parallel to a normal axis of the road vehicle. This provision allows the link arm to be movably connected to the vehicle body structure.

Optionally, the wheel hub may be connected to the link arm via a joint allowing the wheel hub to rotate in relation to the link arm around a second rotation axis extending through the joint substantially in parallel to a normal axis of the road vehicle. The steering knuckle may be arranged at a portion of the wheel hub facing the A-pillar. The tie rod may be connected to the steering knuckle at a distance $d2$ from said joint and the breaking line may be arranged at a distance $d1$ from said joint, wherein $d2>d1$. This provision has the benefit that the breaking line is arranged between the tie rod connection and the rotation axis of the wheel hub, such that the steering knuckle breaks along the breaking line and disconnects a portion of the steering knuckle to which the tie rod is connected from a main portion of the wheel hub and thus releases the wheel hub from the tie rod.

Optionally, the link arm may be designed to disconnect the first arm element from the vehicle body structure and to rotate around the rotation axis of the second connection element in the vehicle body structure during a small overlap collision, thereby moving the wheel hub along an arcuate path. This provision allows the front wheel hub assembly to further disconnect from the vehicle body structure and to be swung out towards the outside of the A-pillar of the vehicle body, such that a wheel comprised in the front wheel hub assembly is guided away from impacting the A-pillar of the vehicle body.

Optionally, the steering knuckle breaker may be made of aluminum, steel or plastic. Thereby, the steering knuckle breaker may be produced at a low cost, light and/or strong. Steel has the benefit that the steering knuckle breaker may be strong, plastic has the benefit that steering knuckle breaker is very light and aluminum has the benefit that the steering knuckle breaker may be stronger than plastic and lighter than steel.

Optionally, the steering knuckle breaker has a width of 60 to 150 mm, a height of 80 to 160 mm and a depth of 20 to 80 mm, preferably a width of 90 to 110 mm, a height of 110 to 130 mm, and a depth of 30 to 60 mm. This provision has the benefit that the steering knuckle breaker has a size which enables a disconnection of the tie rod from the wheel hub during an impact without limiting the available space for the wheel during vehicle driving conditions.

Also disclosed is a vehicle including a front wheel hub assembly disconnection arrangement according to any of the embodiments described above.

Also disclosed is the use of a steering knuckle breaker arranged on an A-pillar of a vehicle, for effecting detachment of a tie rod from a front wheel hub assembly during a collision.

Also disclosed is the use of a front wheel hub assembly disconnection arrangement in a vehicle for effecting detachment of a tie rod from a front wheel hub assembly during a small partial overlap collision. This provision has the benefit that the wheel and the wheel hub arrangement may be guided away from the A-pillar of the vehicle body structure during the SPOC and thus reduces the damage to the A-pillar and the intrusion of damaged parts into the passenger compartment of the vehicle.

The embodiments herein provide numerous benefits and advantages over existing solutions in that they provide a flexible and effective way to in detail trigger a disconnection of the tie rod from the steering knuckle, opening up many possibilities to reduce the weight and cost of the vehicle body cost while improving passenger safety.

Embodiments herein relate to a front wheel hub assembly disconnection arrangement for reducing the impact forces in a Small Partial Overlap Crash (SPOC). The embodiments herein provide a controlled disconnecting behavior of a front wheel hub assembly, such that upon impact with a vehicle body structure, a steering knuckle breaks in a designed manner in order to release the connection to the steering tie rod and other crucial elements. The purpose of this is to allow the front wheel hub assembly, which front wheel hub assembly may include e.g. a wheel, a break disc, a link arm and a wheel hub, to move freely and to be guided away from impacting an A-pillar area. The importance of this is two-fold. By nature, chassis components are generally designed to be very stiff and to transfer a large amount of load. If the front wheel hub assembly is not guided away properly, the only way to stop it from intruding into the passenger compartment is to design a very stiff A-pillar (or similar) section capable of absorbing the loads and energy. If the load and energy from the impact cannot be handled by the body-in-white this will translate directly into reduced safety performance of the vehicle. Hence, by providing a controlled deformation and by guiding the chassis components away from the vehicle body, intrusions into a passenger compartment of the vehicle may be reduced and the safety of the passengers can be largely improved. Furthermore, by guiding the critical components, such as the front wheel hub assembly, away from the vehicle body, it is possible to reduce the required load bearing capacity of the vehicle body structure, such as the body-in-white. Thereby, a more weight optimized design may be achieved, with benefits such as e.g. lowered fuel consumption. A further benefit of the embodiments herein is that instead of stopping the vehicle head-on on the A-pillar, which may also be referred to as a stack up of the front wheel hub assembly, and which requires the A-pillar to absorb high forces, the vehicle may be guided away from the obstacle. Thereby the vehicle may slide off the obstacle, such as the barrier or an incoming vehicle. By sliding off the barrier, instead of stopping head-on, the deceleration of the passenger may be reduced, which is beneficial from a safety point of view. Whereas a head-on stop strategy will transfer all the non-absorbed energy by body components to the airbag and safety belt, some of that energy will in a scenario where the vehicle slides off the obstacle, be mitigated or dissipated by not stopping the car completely.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

Figure 1:
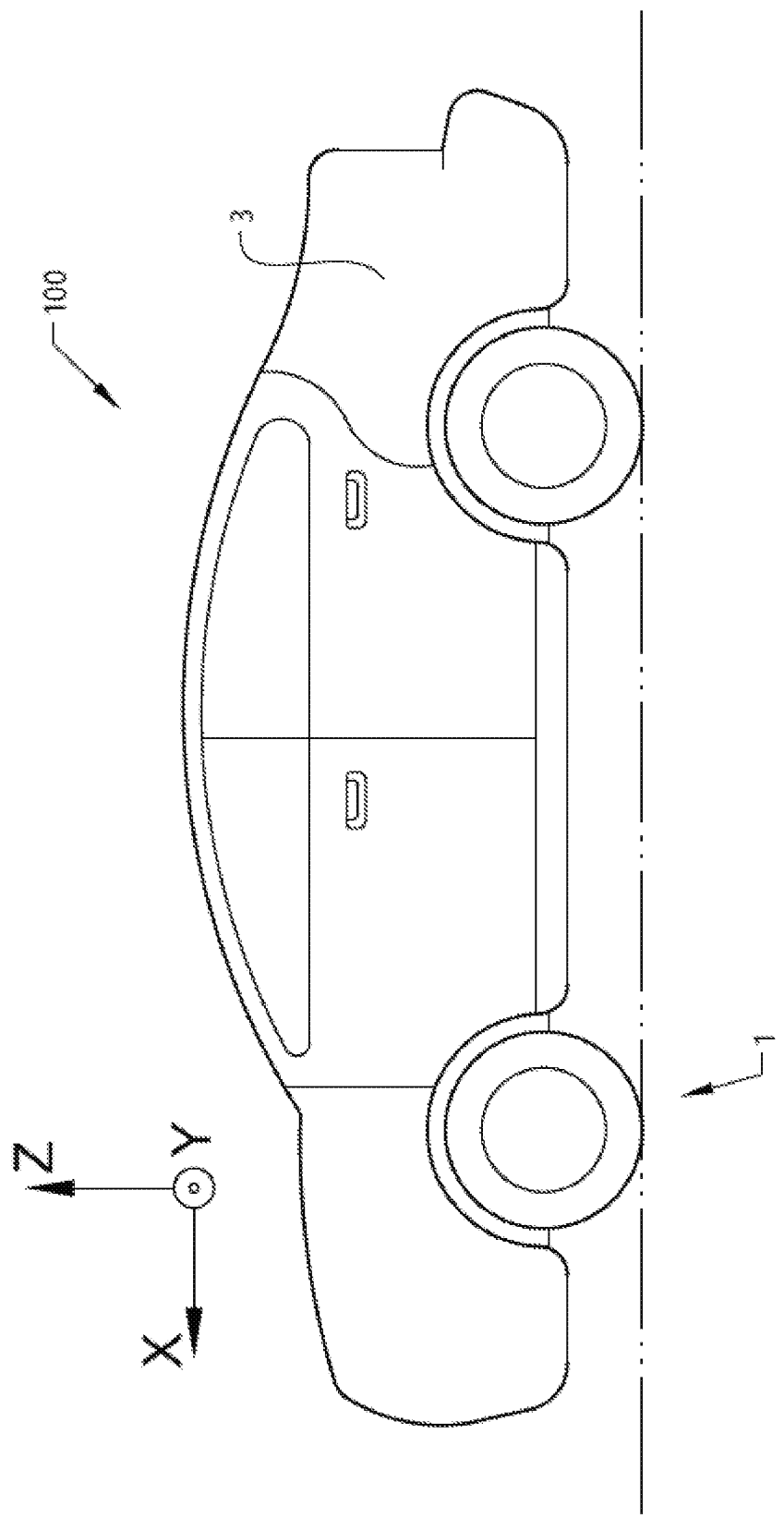
FIG. 1 is a schematic overview of a road vehicle according to embodiments herein.

FIG. 1 shows an overview of a road vehicle 100 according to embodiments herein. The road vehicle 100 includes a vehicle body structure 3 and a front wheel hub assembly disconnection arrangement 1, which will be further discussed in relation to the FIGS. 2 to 8. The road vehicle 100 has an x-axis, a y-axis and a z-axis. The x-axis, which may also be referred to as a longitudinal axis, extends in parallel to the ground along the length of the car when the vehicle is at rest. The y-axis, which may also be referred to as a lateral axis, is orthogonal to the longitudinal axis also and also extends parallel to the ground when the road vehicle 100 is at rest. The z-axis, which may also be referred to as a vertical axis or a normal axis, is orthogonal to both the longitudinal and lateral axes. Since the SPOC usually occurs when the road vehicle 100 is travelling in a straight line, the x-direction may herein also be referred to as a direction of travel.

Figure 2:
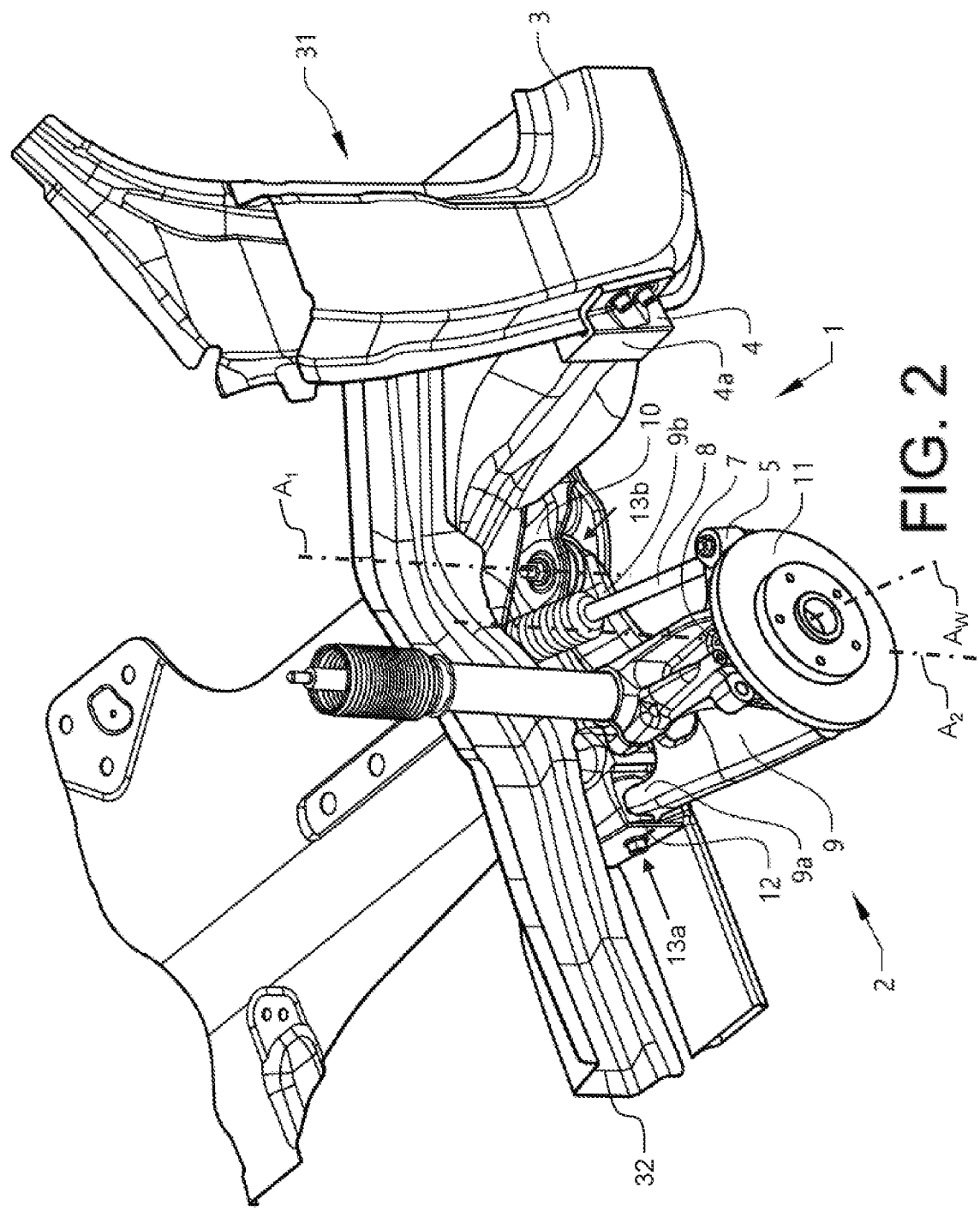
FIG. 2 is a schematic illustration of a front wheel hub assembly disconnection arrangement according to embodiments herein.

FIG. 2 shows a perspective view of the front wheel hub assembly disconnection arrangement 1 for the road vehicle 100 according to the embodiments herein. The front wheel hub assembly disconnection arrangement 1 is configured to promote disconnection and outwards movement of a front wheel hub assembly 2 from the vehicle body structure 3 during a small overlap collision. The vehicle body structure 3 includes an A-pillar 31 and a side member 32 for transferring loads to the A-pillar 31. The front wheel hub assembly disconnection arrangement 1 includes a steering knuckle breaker 4 and the front wheel hub assembly 2. The front wheel hub assembly 2 includes a wheel hub 7 and a steering knuckle 5 for connection to a tie rod 8 of a steering mechanism. The steering knuckle 5 is arranged on a rearward facing portion of the wheel hub 7, seen in a direction of travel of the road vehicle 100, i.e. along the longitudinal axis of the road vehicle 100. A brake assembly including a brake rotor 11 and a brake caliper (not shown) and a wheel (not shown) including a rim and a tire may further be rotatably mounted to the front wheel hub assembly 2 around a wheel axis $A_W$. The steering knuckle breaker 4 is arranged on the A-pillar 31 of the vehicle body structure 3 at a location such that during a SPOC, the steering knuckle 5 of the front wheel hub assembly 2 collides with the steering knuckle breaker 4, e.g. with an impact surface 4a of the steering knuckle breaker 4, and breaks. Preferably, the steering knuckle breaker 4 is arranged on a surface of the A-pillar 31 facing in a forward direction of the vehicle towards the steering knuckle 5 when the wheel hub 7 is in a neutral position. The wheel hub 7 is in the neutral position when a wheel mounted on the wheel hub 7 is pointing in a straight direction allowing the vehicle to travel in a straight forward direction. The impact surface 4a of the steering knuckle breaker 4 is arranged facing the steering knuckle 5 when the wheel hub 7 is in the neutral position, such that in the event of a SPOC, the steering knuckle 5 of the front wheel hub assembly 2 is displaced towards and collides with the steering knuckle breaker 4, such that the steering knuckle breaker 4 breaks the steering knuckle 5, e.g. by applying a force and/or a bending moment to the steering knuckle 5. This causes the steering knuckle 5 to disconnect from the wheel hub 7 of the front wheel hub assembly 2. Thereby the tie rod 8 connected to the steering knuckle 5 is disconnected from the front wheel hub assembly 2, allowing the front wheel hub assembly 2 to move independently from the tie rod 8 and a steering rack connected to the tie rod 8.

The wheel hub 7 is connected to a link arm 9 via a joint (not shown), such as e.g. a ball joint, allowing the wheel hub 7 to rotate in relation to the link arm 9 around a second rotation axis $A_2$ extending through the joint substantially in parallel to the normal axis of the road vehicle 100. The steering knuckle 5 is arranged at a portion of the wheel hub 7 facing the A-pillar 31 and is configured to fail upon impact with the steering knuckle breaker 4.

The link arm 9 is further connected to the vehicle body structure 3 through a first and a second arm element 9a, 9b. The first arm element 9a is arranged to be connected to a first connection element 13a in the vehicle body structure 3, e.g. by means of a bushing 12 arranged in the first arm element 9a, and bolted to the vehicle body structure 3 or to a subframe 10 of the vehicle body structure 3. The second arm element 9b is arranged to be rotatably connected to a second connection element 13b in the vehicle body structure 3 around a first rotation axis $A_1$ substantially parallel to the normal axis of the road vehicle 100. The wheel hub 7 is connected to the link arm 9 by means of e.g. the ball joint, such that the wheel hub 7 is rotatably connected to the link arm 9 to allow a turning of the front wheel hub 7 around the second rotation axis $A_2$ in relation to the link arm 9. The link arm 9 is connectable to the vehicle body structure 3, e.g. directly to the vehicle body structure 3 or via the subframe 10 mounted to and forming a part of the vehicle body structure 3, through the first arm element 9a and the second arm element 9b. The link arm 9 is designed to disconnect the first arm element 9a from the vehicle body structure 3 and to rotate around the first rotation axis $A_1$ of the second connection element in the vehicle body structure 3 during the SPOC, thereby moving the wheel hub 7 along an arcuate path. Due to the movement along the arcuate path the wheel hub 7 and the wheel is moved outwards out of the way of the A-pillar 31 of the vehicle body structure 3.

In the following, the FIGS. 3 to 8 show various aspects of a first embodiment of the front wheel hub assembly disconnection arrangement 1 disclosed herein.

Figure 3:
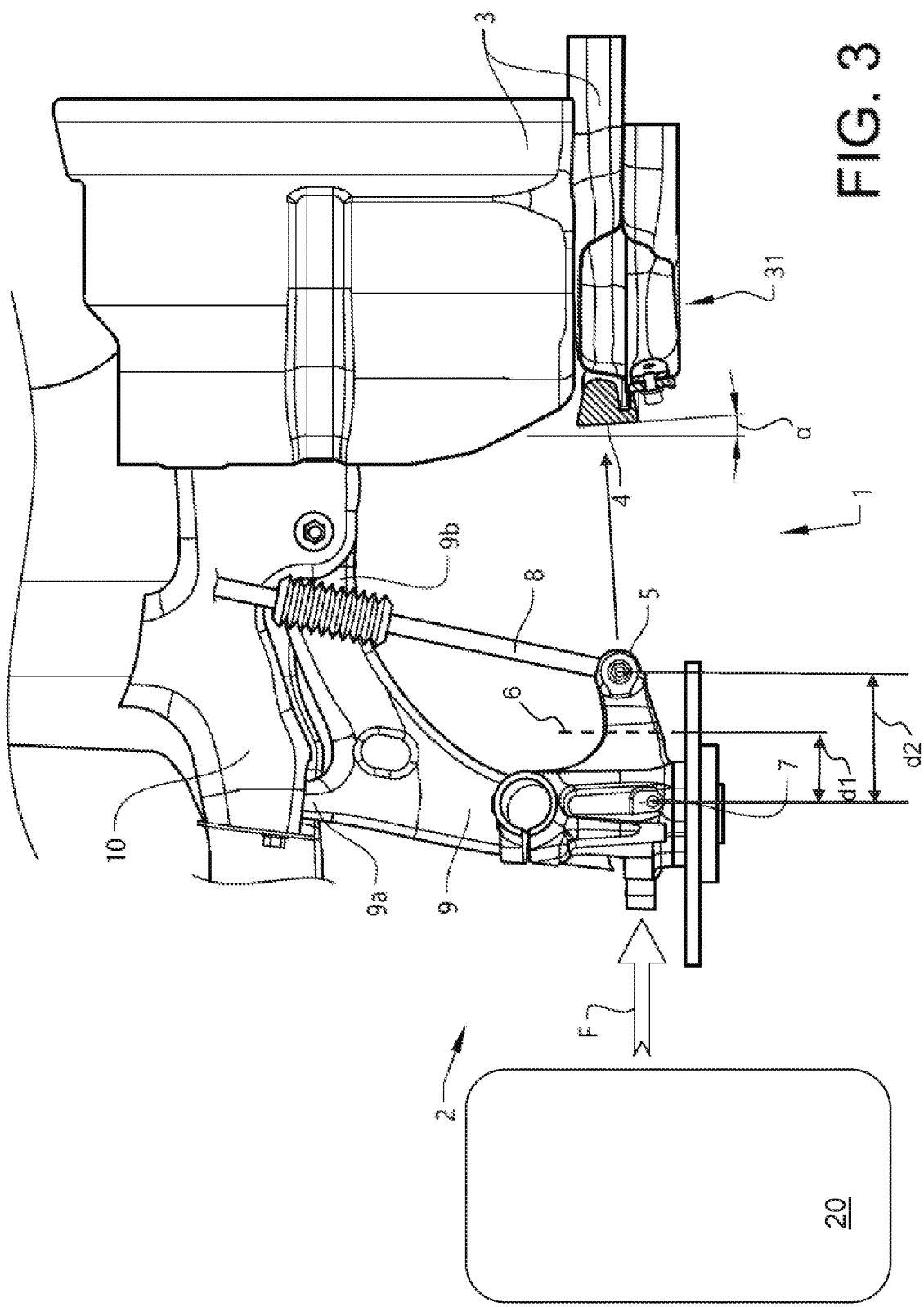
FIG. 3 is a schematic illustration of the front wheel hub assembly disconnection arrangement of FIG. 2 seen from above in an initial state.

FIG. 3 shows a top view of the front wheel hub assembly disconnection arrangement 1 according to an embodiment herein in an initial state when the SPOC is initiated. An obstacle 20, colliding with the vehicle, such as e.g. a barrier or a portion of a second vehicle, will hit the front wheel hub assembly 2 and will act with a force F upon the front wheel hub assembly 2. The steering knuckle 5 is arranged at a portion of the wheel hub 7 facing the A-pillar 31. The force F will force the wheel hub 7 and the steering knuckle 5 towards the steering knuckle breaker 4, which is arranged on the A-pillar 31 of the vehicle body structure 3, such that the steering knuckle 5 collides with the steering knuckle breaker 4. Due to the collision with the reinforcement element 4, a force and/or bending moment is introduced into the steering knuckle 5 which will break the steering knuckle and disconnect it from the wheel hub 7 of the front wheel hub assembly 2. This in turn will release the tie rod 8 connected to the steering knuckle 5 from the front wheel hub assembly 2. To achieve this effect the reinforcement element 4 may be configured stiffer than the steering knuckle 5, such that it is able to break the steering knuckle 5 upon impact. In order to facilitate the release of the tie rod 8, the steering knuckle 5 may include a weakened zone adapted to form a predetermined breaking line 6. The tie rod 8 is connected to the steering knuckle 5 at a distance d2 from the previously mentioned joint connecting the wheel hub 7 to the link arm 9 and the breaking line 6 of the steering knuckle 5 is arranged at a distance d1 from the previously mentioned joint connecting the wheel hub 7 to the link arm 9. The distance d2 is larger than the distance d1, i.e. d2>d1, such that the portion of the steering knuckle 5 to which the tie rod 8 connects breaks off, which may also be referred to as disconnects, from the wheel hub 7. The impact surface 4a of the steering knuckle breaker 4 is arranged at an angle of attack α to a plane perpendicular to the longitudinal axis of the road vehicle 100. Due to the angular impact of the steering knuckle 5 on the impact surface 4a a bending moment acting on the steering knuckle 5 may be created which may facilitate the breaking of the steering knuckle 5. When the steering knuckle 5 fails due to the breaking, the front wheel hub 7 may further be moved or guided away from the longitudinal central axis of the vehicle body structure 3 by sliding along the angled impact surface 4a of the steering knuckle breaker 4, which may cause the wheel hub 7 and a wheel connected to the wheel hub 7 to be rotated away from impacting the A-pillar 31 in a radial direction of the wheel. Due to the rotation of the wheel hub 7, the wheel may instead impact the A-pillar 31 in an axial direction. The angle of attack α of the steering knuckle breaker 4 may e.g. be in the range of 2-25 degrees, preferably in the range of 5-20 degrees.

Figure 4:
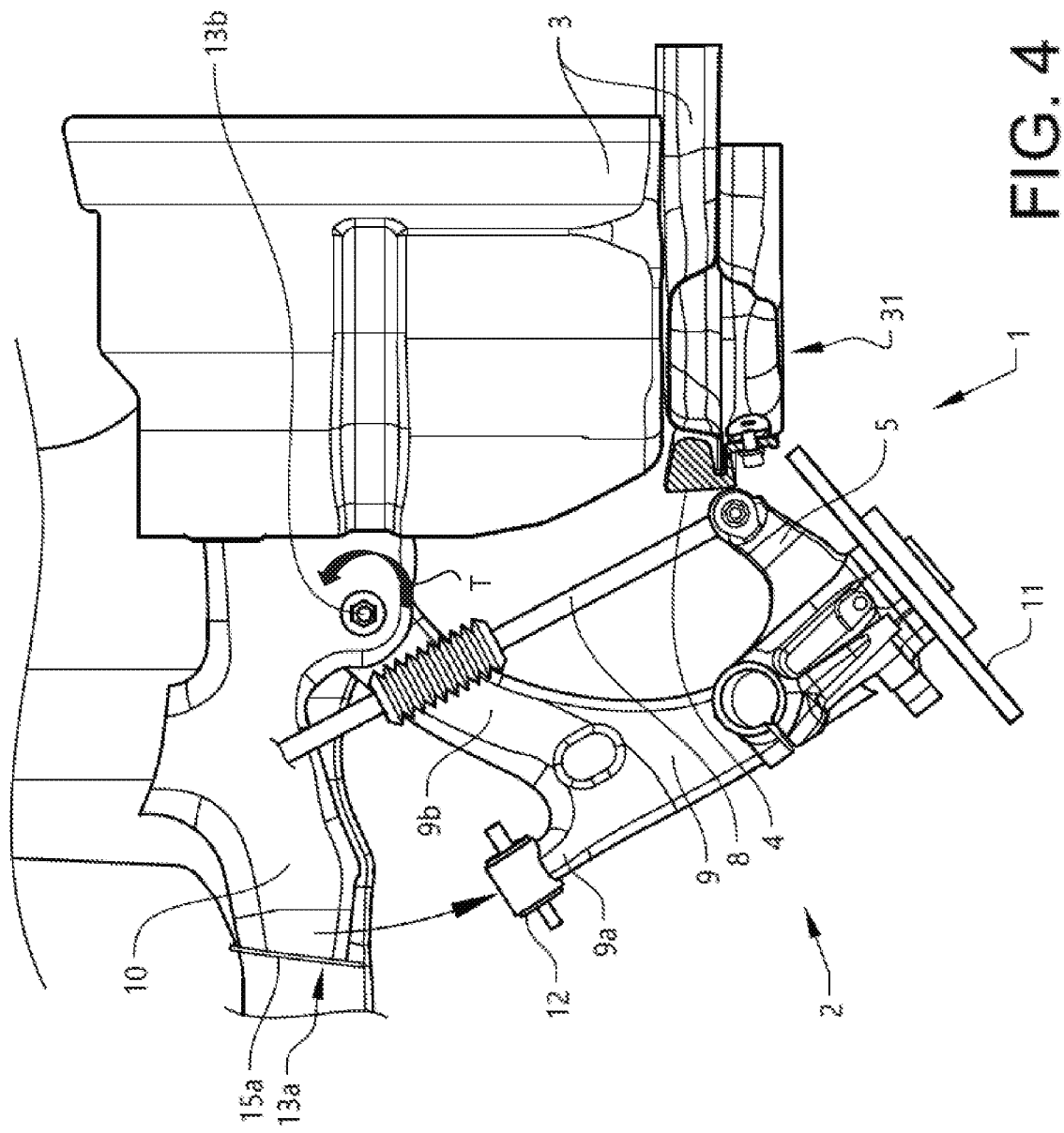
FIG. 4 is a schematic illustration of the front wheel hub assembly disconnection arrangement of FIG. 2 seen from above during a SPOC.

FIG. 4 shows a top view of the front wheel hub assembly disconnection arrangement 1 according to the embodiment shown in FIG. 3 during the SPOC. The wheel hub 7 is connected to the link arm 9, which link arm 9 is connectable to the vehicle body structure 3 through the first arm element 9a and the second arm element 9b. The first arm element 9a is connected to the first connection element 13a in the vehicle body structure 3, such as e.g. in the subframe 10, and the second arm element 9b is rotatably connected to the second connection element 13b in the vehicle body structure 3, such as e.g. in the subframe 10. The second connection element 13b is arranged closer to the rear of the vehicle than the first connection 13a and may thus also be referred to as a rear connection element or rear fixing point. The force F acting on the front wheel hub assembly 2 may thus further introduce a torque T via the link arm 9 around the second connection element 13b and the first axis $A_1$. This torque may cause the link arm 9 to disconnect from the first connection element 13a. The link arm 9 according to the embodiments herein may thus be designed stiff enough to break the first connection element 13a. When the link arm 9 has disconnected from the first connection element 13a the link arm 9 may rotate around the second connection element 13b. Due to the motion of the link arm 9 as described above, the link arm 9 may guide the steering knuckle 5 rearwards into the A-pillar 31 area where the steering knuckle breaker 4 is located, and further guides the front wheel hub assembly 2 towards an outside of the vehicle body structure 3. Thereby an outwards movement of the front wheel hub assembly 2 from the vehicle body structure 3, may further be promoted.

By disconnecting the tie rod 8 from the steering knuckle 5 as well as the link arm 9 from the first connection element 13a, the degree of freedom of the front wheel hub assembly 2 is increased. Thus the complete front wheel hub assembly 2, which may include the wheel, is free to slide towards an outside of the vehicle body structure 3 and thus miss the main portion of the A-pillar 31 of the vehicle body structure 3.

Figure 5:
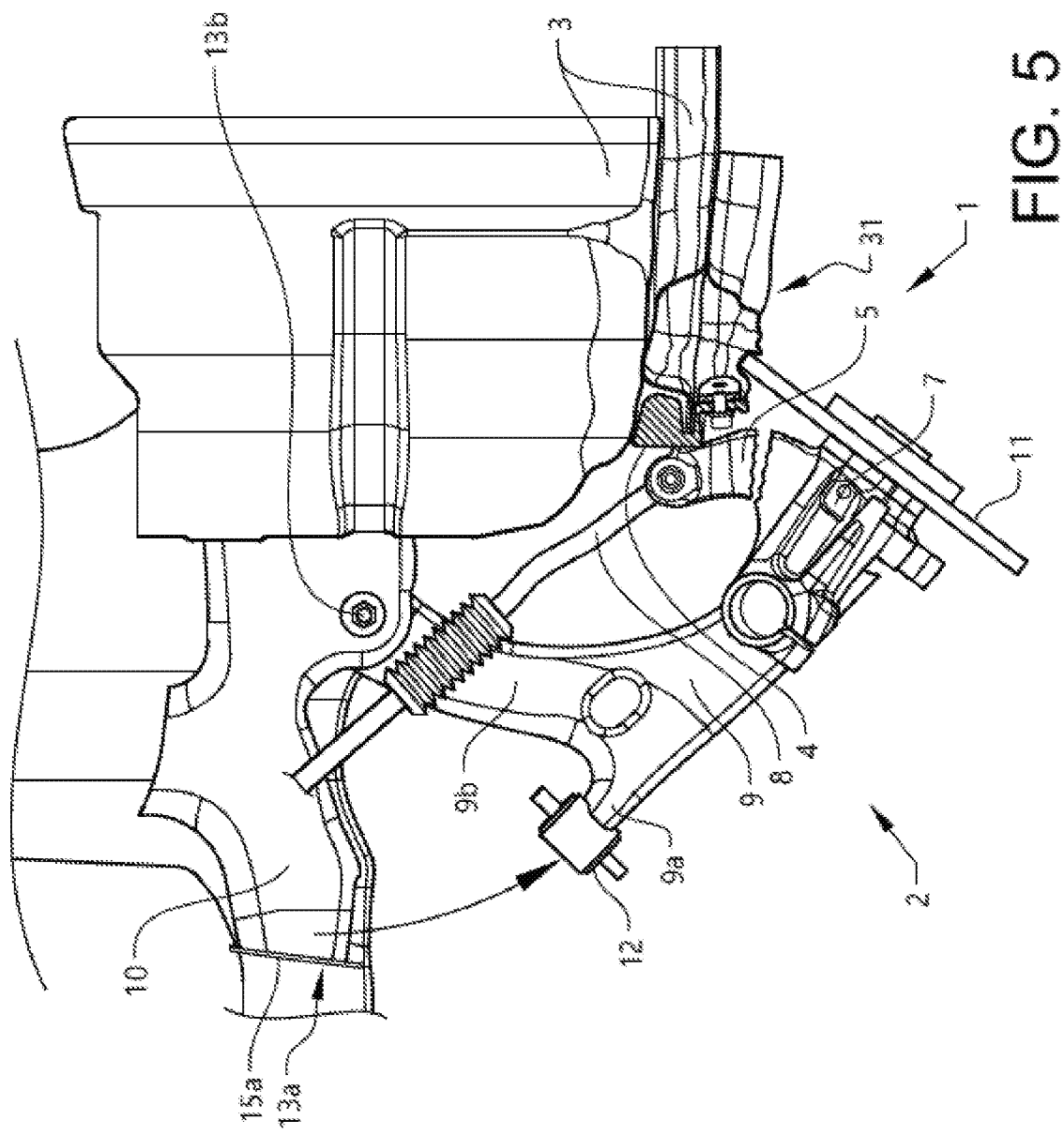
FIG. 5 is a schematic illustration of the front wheel hub assembly disconnection arrangement of FIG. 2 seen from above after the SPOC.

FIG. 5 shows a top view of the front wheel hub assembly disconnection arrangement 1 according to the embodiment shown in FIGS. 3 and 4 after the SPOC. As can be seen, the steering knuckle 5 collides with the steering knuckle breaker 4, in particular with the impact surface 4a of the steering knuckle breaker 4, and breaks, thereby disconnecting the tie rod 8 from the front wheel hub assembly 2. In order to facilitate the breaking of the steering knuckle 5, the impact surface 4a may be arranged at an angle of attack α to a plane perpendicular to the longitudinal axis of the road vehicle 100. Thereby, a bending moment is introduced to the steering knuckle 5, which facilitates the breaking of the steering knuckle 5. This leaves the wheel and front wheel hub assembly 2 free to move away from the A-pillar 31 of the vehicle body structure 3, e.g. by the wheel hub rotating around the ball joint connecting the wheel hub to the link arm 9, and/or by rotating the complete front wheel hub assembly 2 around the second connection element 13b. The angle of attack α of the impact surface 4a may also promote a movement of the front wheel hub assembly 2 away from the longitudinal axis of the vehicle body structure 3. The wheel hub 7 may e.g. be forced to rotate around the ball joint connecting the wheel hub to the link arm 9, such that the wheel does not collide radially with the A-pillar 31 but rather in an axial direction of the wheel in which direction the wheel is weaker and occupies a smaller amount of space. Although the A-pillar 31 may be deformed by the steering knuckle 5 colliding with the steering knuckle breaker 4, the deformation is significantly smaller than for known solutions. Furthermore, since the forces acting on the A-pillar 31 during the collision are reduced, a side-member 32 having a one-leg design may be used instead of the two-leg design commonly used. The one-leg side-member only includes one section which can transfer load from the side-member to the A-pillar 31. Thereby, a weight and cost reduction of the vehicle body structure 3 may be achieved.

Figure 6:
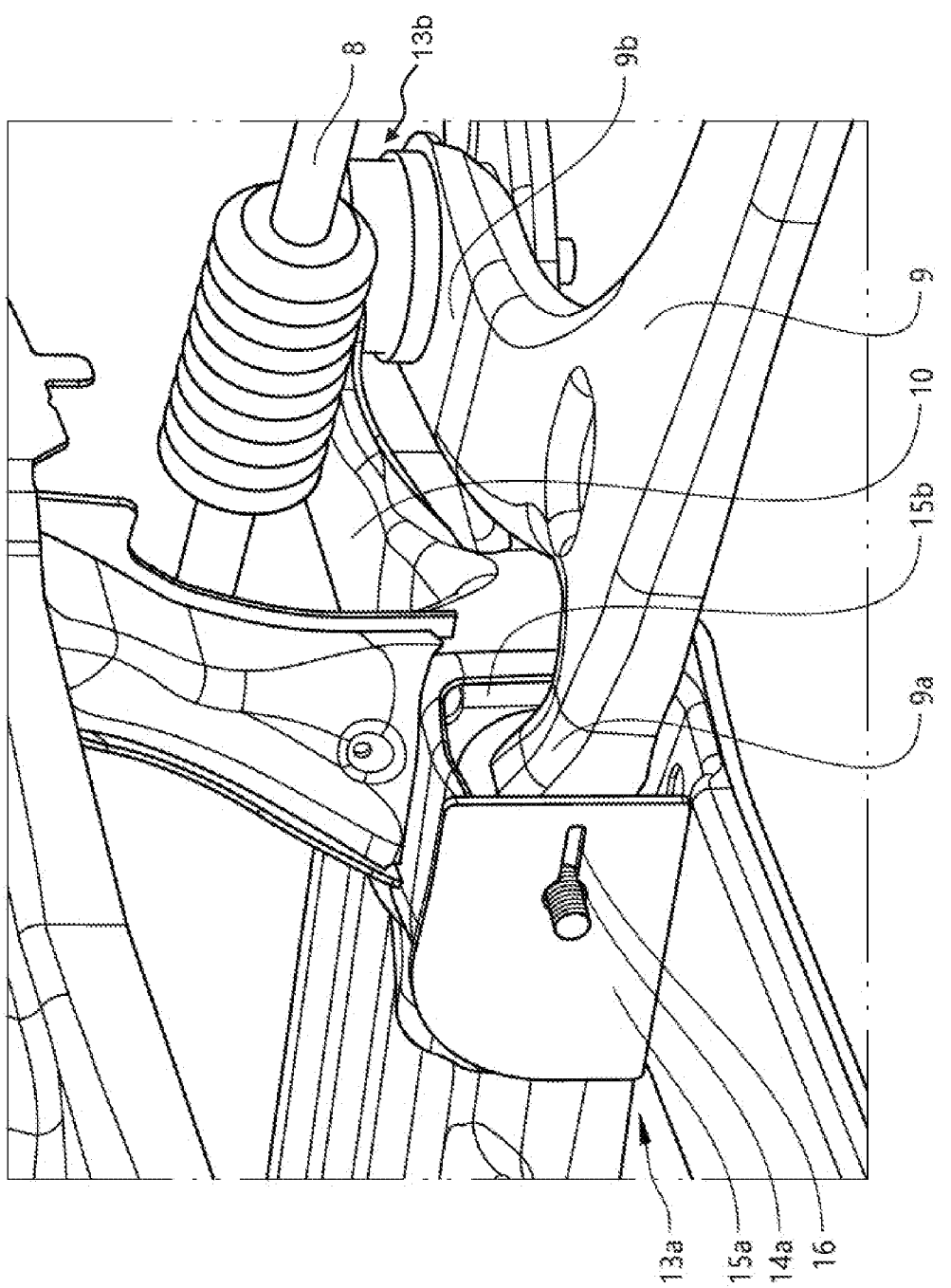
FIG. 6 is a schematic illustration showing a detailed view of a first and second connection element for receiving a first and the second arm element of a link arm in an initial state.

FIG. 6 shows a detailed view of the first and second connection elements 13a, 13b for receiving the first and the second arm elements 9a, 9b of the link arm 9 in an initial condition, such as prior to a collision, such as a SPOC. The first connection element and/or the link arm 9 may be configured to disconnect the first arm element 9a from the vehicle body structure 3. The first connection element 13a and/or the link arm 9 may e.g. include a weakening configured to break when the force F acts on the front wheel hub assembly 2 with a certain magnitude. According to some embodiments herein, the first arm element 9a may e.g. be mounted to the first connection element 13a by means of a bushing comprised in and located at a distal end of the first arm element 9a and a bolt and nut inserted through a first and second through hole 14a, 14b of the first connection element 13a and the bushing comprised in the first arm element 9a of the link arm 9. Each of the through holes 14a, 14b is arranged on a respective side wall 15a, 15b of the first connection element, wherein the side walls is arranged to form a box-shaped structure for receiving the first arm element 9a of the link arm 9. One or more of the side walls of the first connection element may include a slot 16 protruding through the side wall 15a, 15b and extending from the through hole 14a, 14b towards the wheel hub facing end of the side wall 15a, 15b.

Figure 7:
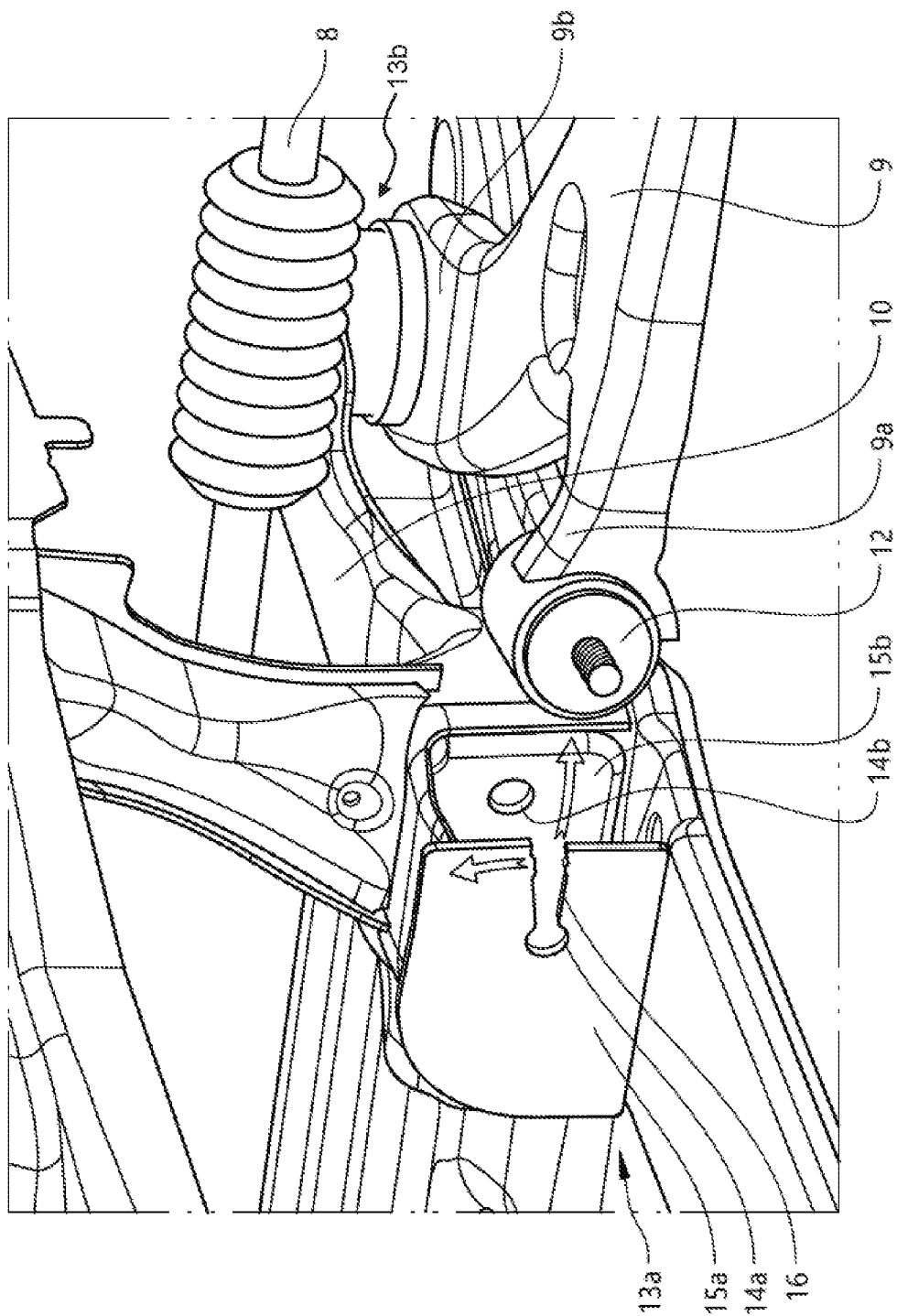
FIG. 7 is a schematic illustration showing a detailed view of a first and second connection element for receiving a first and the second arm element of a link arm during the SPOC.

FIG. 7 shows a detailed view of the first and second connection elements for receiving the first and the second arm elements 9a, 9b of the link arm 9 in a condition, during and/or after a collision, such as a SPOC. When the force F acts upon the front wheel hub assembly 2, a torque is created which forces the link arm 9 to rotate in and/or by means of the second connection element 13b around the first rotation axis $A_1$. Due to the torque applied on the link arm 9 the first arm element is forced towards the slot 16 in the side wall of the connection element, which may cause the bolt to slide through the slot 16 and upon impact with the end of the slot 16 causing the side wall to break due to weakening of the side wall caused by the slot 15. Thereby the first arm element 9a is released from the first connection element allowing the link arm to freely rotate in and/or by means of the second connection element 13b around the first rotation axis $A_1$, which will cause the front wheel hub assembly 2 to be moved to an outside of the vehicle body structure. According to a further embodiment, which is not shown in FIG. 7, the bolt connecting the first arm element 9a to the first connection element 13a, may be configured with a weakening which may cause the bolt to shear off as a result of the torque acting on the link arm 9 around the second connection element 13b during the SPOC, which may also cause a disconnection of the first arm element 9a from the vehicle body structure 3.

Figure 8:
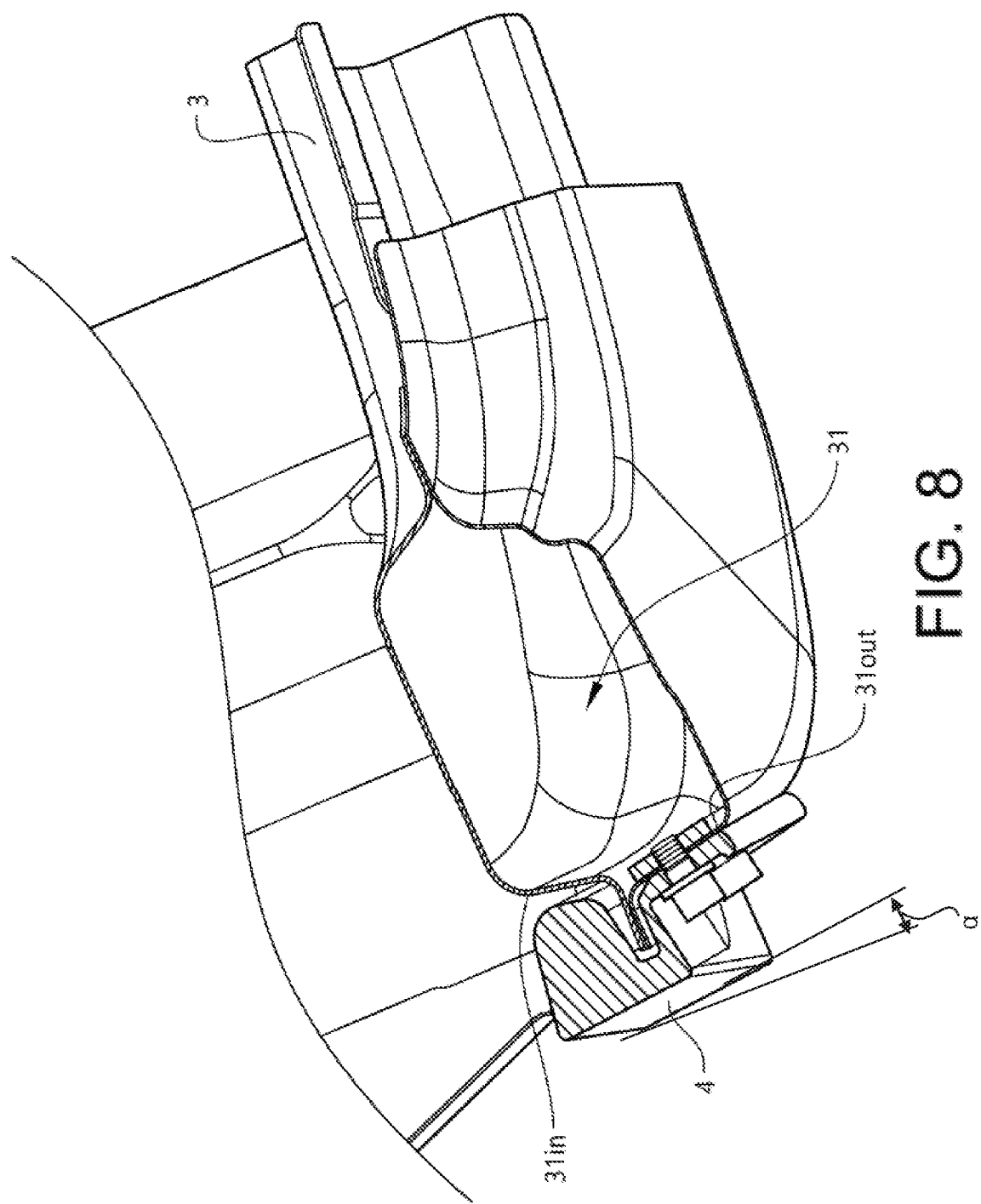
FIG. 8 is a schematic illustration showing details of a steering knuckle breaker arranged on an A-pillar of a vehicle body structure.

FIG. 8 is a detailed view of the steering knuckle breaker 4 arranged on the A-pillar 31 of the vehicle body structure 3. The vehicle body structure 3 may include an automotive body-in-white which includes the A-pillar 31, or other similar components as to achieve a similar design intent, which form a load bearing section. The A-pillar 31 may include an inner A-pillar $31_{in}$ and an outer A-pillar $31_{out}$. The steering knuckle breaker 4 is attached to the A-pillar, such as e.g. to one or more surfaces of the A-pillar 31 or to a longitudinally pointing weld flange or flanges of the A-pillar 31, of the vehicle body structure 3 by means of fastening means, such as a screw, a nut, a riveting element and/or by welding. The steering knuckle breaker 4 may include an impact surface 4a arranged to collide with the steering knuckle 5. The impact surface 4a may be arranged at an angle of attack α to a plane perpendicular to the longitudinal axis of the road vehicle 100, such that when the steering knuckle 5 collides with the impact surface 4a of the steering knuckle breaker 4, a bending moment is introduced to the steering knuckle 5, which facilitates the breaking of the steering knuckle 5. Furthermore, the angle of attack α may further force the front wheel hub assembly to move away from the longitudinal central axis of the vehicle body structure 3, thereby guiding the front wheel hub assembly 2 away from the A-pillar 31. The angle of attack α of the steering knuckle breaker 4 may e.g. be in the range of 2-25 degrees, preferably in the range of 5-20 degrees. The embodiments herein provide a solution for the vehicle body structure 3 to be able to break critical chassis components, such as e.g. the steering knuckle 5, in order to find a behavior as laid out above, and to be tunable as to find the right balance in order to achieve a controlled disconnection of the tie rod 8 from the steering knuckle 5. One parameter used for tuning the behavior may be the angle of attack α of the reinforcement element 4, which angle α is the angle the steering knuckle 5 meets when colliding with the reinforcement element 5 located on the vehicle body structure 3. As such, this angle of attack α may introduce a bending moment that can be used to break the steering knuckle 5 and/or to direct the front wheel hub assembly 2 in a certain direction.

The steering knuckle breaker 4 may e.g. be produced or manufactured by means of extrusion. The steering knuckle breaker 4 may have an extrusion direction located in the vehicle's vertical direction once the steering knuckle breaker 4 is in an assembled position. The steering knuckle breaker 4 may further be manufactured to final dimension by any form of cutting or milling process. The steering knuckle breaker 4 may further include an impact surface 4a arranged to collide with the steering knuckle 5. The steering knuckle breaker 4 may e.g. be made of aluminum, steel or plastic. The steering knuckle breaker 4 may e.g. have a width of 60 to 150 mm, a height of 80 to 160 mm and a depth of 20 to 80 mm, preferably a width of 90 to 110 mm, a height of 110 to 130 mm, and a depth 30 to 60 mm. This allows the steering knuckle breaker 4 to be large enough to ensure a controlled collision with the steering knuckle 5 without interfering with any moving parts of the vehicle during normal driving conditions. The width of the steering knuckle breaker 4 shall herein be interpreted as the extension in the y-direction, the height shall herein be interpreted as the extension in the z-direction and the depth shall herein be interpreted as the extension in the x-direction, when the steering knuckle breaker is arranged on the A-pillar 31 of the road vehicle 100.

Furthermore, since the wheel and front wheel hub assembly 2 may be guided away from the A-pillar 31, a one-leg front side member may be used in the vehicle body structure 3. Such a design has the benefit that the weight and cost of the vehicle may be reduced. By adding the reinforcement element 4 to the A-pillar 31 according to the embodiments herein, the low weight benefits of the one-legged side member may be combined with the strength of the two-legged front side member to break the desired chassis components, such as the steering knuckle 5 in a predetermined and controlled manner. Furthermore, since the wheel hub disconnection arrangement 1 may guide the wheel and front wheel hub assembly 2 away to an outside of the A-pillar 31, low intrusions into the passenger compartment of the vehicle can be achieved.

Embodiments herein further relate to a vehicle, such as e.g. a road vehicle 100, including a front wheel hub assembly disconnection arrangement 1 according to any of the embodiments described above.

Embodiments herein further relate to the use of a steering knuckle breaker 4 arranged on an A-pillar 31 of a road vehicle 100, for effecting detachment of a tie rod 8 from a front wheel hub assembly 2 during a collision.

Embodiments further relate to the use of a front wheel hub assembly disconnection arrangement 1 according to any of the embodiments described above in a vehicle, for effecting disconnection and outwards movement of a front wheel hub assembly 2 from a vehicle body structure 3 during a collision.

The invention claimed is:

1. A front wheel hub assembly disconnection arrangement for a road vehicle, said front wheel hub assembly disconnection arrangement being configured to promote disconnection and outwards movement of a front wheel hub assembly from a vehicle body structure during a small partial overlap collision, wherein the front wheel hub assembly disconnection arrangement comprises: a steering knuckle breaker and the front wheel hub assembly, the front wheel hub assembly comprising a wheel hub and a steering knuckle for connection to a tie rod of a steering mechanism, the steering knuckle being arranged on a rearward facing portion of the wheel hub, seen in a direction of travel of the road vehicle, wherein the steering knuckle breaker is arranged on an A-pillar of the vehicle body structure, said steering knuckle breaker comprising an impact surface facing the steering knuckle when the wheel hub is in a neutral position, such that in the event of a small overlap collision, the steering knuckle of the front wheel hub assembly is displaced towards and collides with the steering knuckle breaker, such that the steering knuckle breaker breaks the steering knuckle and disconnects the steering knuckle from the wheel hub of the front wheel hub assembly.

2. The front wheel hub assembly disconnection arrangement according to claim 1, wherein the steering knuckle comprises a weakened zone adapted to form a predetermined breaking line.

3. The front wheel hub assembly disconnection arrangement according to claim 2, wherein the impact surface is arranged at an angle of attack to a plane perpendicular to a longitudinal axis of the road vehicle, when the steering knuckle breaker is mounted on the A-pillar.

4. The front wheel hub assembly disconnection arrangement according to claim 3, wherein the angle of attack of the steering knuckle breaker is in the range of 2-25 degrees relative to the plane perpendicular to the longitudinal axis of the road vehicle when the steering knuckle breaker is mounted on the A-pillar.

5. The front wheel hub assembly disconnection arrangement according to claim 1, wherein the steering knuckle breaker is attached to the A-pillar of the vehicle body structure by means of fastening means, such as a screw, a nut, a riveting element and/or by welding.

6. The front wheel hub assembly disconnection arrangement according to claim 1, wherein the wheel hub is connected to a link arm, which link arm is connectable to the vehicle body structure through a first and a second arm element, wherein the first arm element is arranged to be connected to a first connection element in the vehicle body structure, and wherein the second arm element is arranged to be rotatably connected to a second connection element in the vehicle body structure around a first rotation axis ($A_1$) substantially parallel to a normal axis of the road vehicle.

7. The front wheel hub assembly disconnection arrangement according to claim 3, wherein the wheel hub is connected to the link arm via a joint allowing the wheel hub to rotate in relation to the link arm around a second rotation axis ($A_2$) extending through the joint substantially in parallel to a normal axis of the road vehicle, the steering knuckle is arranged at a portion of the wheel hub facing the A-pillar, and wherein the tie rod is connected to the steering knuckle at a distance (d2) from said joint of the wheel hub and the breaking line is arranged at a distance (d1) from said joint, wherein d2>d1.

8. The front wheel hub assembly disconnection arrangement according to claim 7, wherein the link arm is designed to disconnect the first arm element from the vehicle body structure and to rotate around the first rotation axis ($A_1$) of the second connection element in the vehicle body structure during a small overlap collision, thereby moving the wheel hub along an arcuate path.

9. The front wheel hub assembly disconnection arrangement according to claim 1, wherein the steering knuckle breaker is made of aluminum, steel or plastic.

10. The front wheel hub assembly disconnection arrangement according to claim 1, wherein the steering knuckle breaker has a width of 60 to 150 mm, a height of 80 to 160 mm and a depth of 20 to 80 mm.

11. A vehicle comprising a front wheel hub assembly disconnection arrangement according to claim 1.

12. A method for providing a front wheel hub assembly disconnection arrangement according to claim 1 in a vehicle, for effecting disconnection and outwards movement of a front wheel hub assembly from a vehicle body structure during a collision.

* * * * *